United States Patent [19]
Kates et al.

[11] Patent Number: 6,130,813
[45] Date of Patent: Oct. 10, 2000

[54] PROTECTION CIRCUIT FOR ELECTRONIC DEVICES

[75] Inventors: Barry K. Kates, Austin; John A. Cummings, Round Rock, both of Tex.

[73] Assignee: Dell U.S.A., L.P., Round Rock, Tex.

[21] Appl. No.: 09/228,463

[22] Filed: Jan. 11, 1999

[51] Int. Cl.[7] .................................................. H02H 3/08
[52] U.S. Cl. ............................ 361/93.1; 361/94; 361/83; 307/80
[58] Field of Search .................................. 361/78, 79, 83, 361/88, 89, 93.1, 93.7, 94; 327/141, 142, 161; 364/528.21, 528.27, 528.28; 307/43, 71, 80, 85, 86, 112, 113, 115, 116, 125, 131; 700/286, 292, 293

[56] References Cited

U.S. PATENT DOCUMENTS

| | | | |
|---|---|---|---|
| 4,638,175 | 1/1987 | Bradford et al. | 307/64 |
| 4,866,556 | 9/1989 | Hebenstreit | 361/91 |
| 4,889,850 | 12/1989 | Thornfeldt et al. | 514/221 |
| 5,018,041 | 5/1991 | Szepesi | 361/18 |
| 5,239,495 | 8/1993 | Nanno et al. | 364/707 |
| 5,300,874 | 4/1994 | Shimamoto et al. | 320/15 |
| 5,355,073 | 10/1994 | Nguyen | 320/15 |
| 5,355,077 | 10/1994 | Kates | 323/224 |
| 5,388,022 | 2/1995 | Ahuja | 361/94 |
| 5,448,441 | 9/1995 | Raposa | 361/18 |
| 5,465,188 | 11/1995 | Pryor et al. | 361/18 |
| 5,625,275 | 4/1997 | Tanikawa et al. | 320/32 |
| 5,726,849 | 3/1998 | Nakamura | 361/93 |
| 5,815,351 | 9/1998 | Ashok et al. | 361/18 |

FOREIGN PATENT DOCUMENTS

0875977 A2   4/1998   European Pat. Off. .

*Primary Examiner*—Josie Ballato
*Assistant Examiner*—Kim Huynh
*Attorney, Agent, or Firm*—Skjerven, Morrill, MacPherson, Franklin & Friel, L.L.P.; Marc R. Ascolese

[57] ABSTRACT

For an electronic device having at least one power switch for each of two or more power sources such that the power switches can be selectively activated or deactivated depending on a signal supplied to them, a protection circuit having a current-sense circuit coupled to measure the current from the two or more power sources, and a latch for producing a switch deactivating signal and applying it to the switches in response to an over-current signal from the current-sense circuit can protect the switches and the electronic device from soft-short circuits and absolute short circuits. Bypass resistors coupled to the switches allow the electronic device to receive a small current ("pre-charge") before any of the switches are activated so that a comparator can test for the presence of various types of short circuits. Additionally, the precharging brings the electronic device to a higher voltage (as compared to no pre-charging) when one of the switches is activated, thereby helping to reduce in-rush currents. Blanking logic allows the protection circuit to tolerate certain in-rush currents by preventing the latch from triggering (e.g., supplying the latch with an under-current signal) for an appropriate time period.

20 Claims, 4 Drawing Sheets

PROTECTION CIRCUIT FOR ELECTRONIC DEVICES

BACKGROUND OF THE INVENTION

1. Field of the Invention

This invention relates to protection circuits and particularly to protection circuits for electronic devices capable of using a plurality of different power sources.

2. Description of the Related Art

Electronic devices (including, for example, desktop computers, servers, portable computers, palmtop computers, personal digital assistants (PDAs), and celluar telephones) need to be protected from component-damaging high currents that can develop from short circuits ("absolute shorts" or "shorts") or soft-short circuits ("soft-shorts") that develop in the device. Soft-short circuits occur when there is some impedance in the conductive path of the device, but the impedance is lower than the device is designed for, thereby leading to excessive current flow, or an over-current condition. A variety of devices can be used to protect against the over-current conditions resulting from shorts or soft-shorts, including files and polymeric positive temperature coefficient switches ("polymeric PTC" or "poly" switches). Fuses are the lowest cost (and lowest power consuming) solution, but they suffer from slow response time, frequent spurious operation, one-time use, and they often subject sensitive electronic components to high instantaneous power absorption. Poly switches protect devices from over-current conditions because the switch increases resistance ("trips") as it is heated by the current. The device remains tripped as long as the over-current is supplied, but will reset when the over-current is removed. Although, poly switches can be reset, poly switches have response times and holding current requirements that are still too large for many applications, particularly use with power metal-oxide-semiconductor field effect transistors (MOSFETs) for power switching in electronic devices.

Instrumentation amplifiers and high side discrete differential current sensing devices can be used in place of fuses and poly switches. High side current sensing is faster than using a fuse or poly switch, and is particularly desirable in electronic devices that do not have a unified ground return e.g., a laptop computer system with several batteries and a DC power source utilizing a moted or pocketed grounding configuration. High side current sensing is also advantageous in situations where a sensitive ground reference cannot be disturbed with a sense resistor that could create voltage offsets, and because ground referenced schemes cannot protect against bypass capacitor failure.

However, instrumentation amplifiers and high side discrete differential current sensing devices suffer from their own set of drawbacks. Such components are generally high cost, they have high quiescent current drain (a particular problem in battery powered electronic devices), they lack the capability to protect during absolute short circuit conditions, and they lack the capability to ignore transient events, (such as power source transitions in devices which can utilize more than one power source, and in-rush current events). For example, in a portable computer system having both a rechargeable battery and a connection to an external DC source (e.g., an AC-DC adapter), large in-rush currents can occur when a power source selector circuit switches the power source from the low voltage, discharged battery to the relatively high voltage DC source. Similar in-rush currents can be generated when switching from a low voltage, discharged battery to a higher voltage, fully charged battery.

Accordingly, it is desirable to have a protection circuit that functions during both absolute and soft-short conditions, has low quiescent power drain, and is capable of handling transient events such as in-rush currents. Additionally, it is desirable to have a protection circuit that can reduce in-rush current, and pretest an electronic device for shorts before allowing power to be applied to the device.

SUMMARY OF THE INVENTION

For an electronic device having at least one power switch for each of two or more power sources such that the power switches can be selectively activated or deactivated depending on a signal supplied to them, it has been discovered that a protection circuit having a current-sense circuit coupled to measure the current from the two or more power sources, and a latch for producing a switch deactivating signal and applying it to the switches in response to an over-current signal from the current-sense circuit can protect the switches and the electronic device from soft-short circuits and absolute short circuits. Bypass resistors coupled to the switches allow the electronic device to receive a small current ("precharge") before any of the switches are activated so that a comparator can test for the presence of various types of short circuits. Additionally, the precharging brings the electronic device to a higher voltage (as compared to no pre-charging) when one of the switches is activated, thereby helping to reduce in-rush currents. Blanking logic allows the protection circuit to tolerate certain in-rush currents by preventing the latch from triggering (e.g., supplying the latch with an under-current signal) for an appropriate time period.

Accordingly, one aspect of the present invention provides a protection circuit for an electronic device having a first and a second switch, each switch operable to electrically connect a first power source and a second power source, respectively, to a load, and each switch adapted to receive a first and a second signal, respectively, for selectively activating and deactivating the respective switch. The protection circuit includes a current-sense circuit coupled to the first and second switches, the current-sense circuit operable to measure a current supplied to the load through at least one of the first and the second switches, and operable to provide an over-current signal. The protection circuit also includes a latch coupled to the current-sense circuit, the latch operable to receive the over-current signal from the current-sense circuit, and provide a switch deactivating signal as the first signal and the second signal to the first and second switch, respectively.

In another aspect of the invention, a computer system includes a processor and a memory coupled to the processor. A first switch is operable to electrically connect a first power source to the processor and memory, and the first switch is adapted to receive a first signal for selectively activating and deactivating the first switch. A second switch is operable to electrically connect a second power source to the processor and memory, and the second switch is adapted to receive a second signal for selectively activating and deactivating the second switch. The computer system also includes a protection circuit having a current-sense circuit coupled to the first and second switches, the current-sense circuit operable to measure a current supplied to the processor and memory through at least one of the first and the second switches, and operable to provide an over-current signal. The protection circuit further includes a latch coupled to the current-sense circuit, the latch operable to receive the over-current signal from the current-sense circuit, and provide a switch deactivating signal as at least one of the first signal and the second signal to the first and second switch, respectively.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
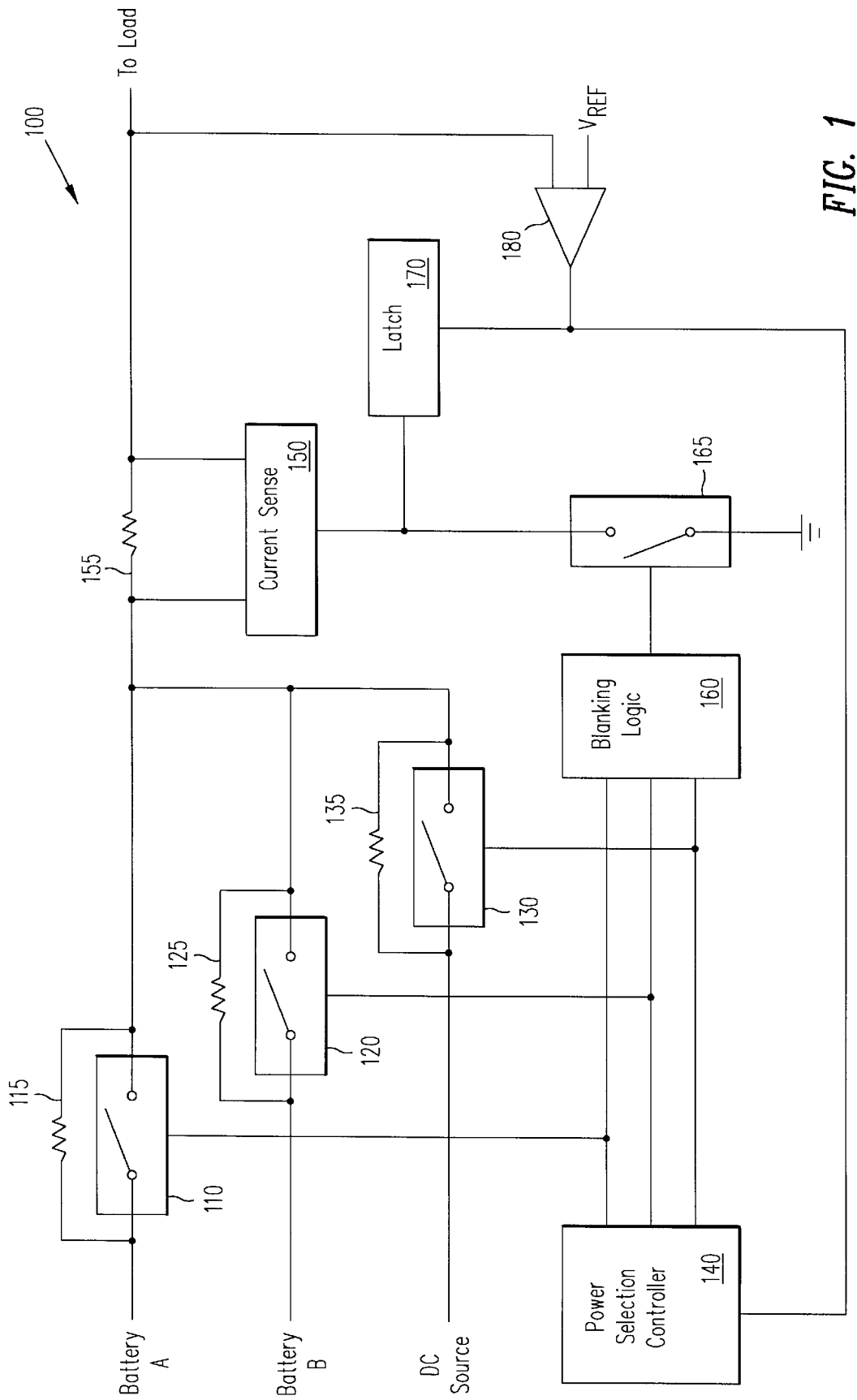
FIG. 1 is a block diagram of a protection circuit including a power source controller.

FIG. 1 illustrates a protection circuit 100 coupled between an electrical load and power source switches 110, 120, and 130. Switches 110, 120, and 130 each allow one of the three power sources indicated (rechargeable battery A, rechargeable battery B, and the DC source) to electrically connect to the load, thereby supplying power to the load. Power selection controller 140 is coupled to each of the switches, and can apply both activating (e.g., turning the switch on, or closing the switch) and deactivating signals to each of the switches. Note that controller 140 need not be part of protection circuit 100, depending upon the implementation. When controller 140 is not part of protection circuit 100, a variety of different controllers can be used in conjunction with the protection circuit. An example of a controller typical of those used as power selection controllers is available from O$_2$ Micro USA, under the trade designation OZ982A, SMBus Smart Battery Selector. In addition to controlling the selection of the power source to deliver to the load, such devices can control which rechargeable battery among multiple rechargeable batteries is to be charged, and can monitor critical power source events. The OZ982A is a so called "smart" battery selector in part because it complies with the *Smart Battery System Specifications, Revision* 1.0, dated Feb. 15, 1995, as well as other Smart Battery Specifications. Smart devices can communicate among each other or with a host device based on the inter-integrated circuit (I$^2$C) bus protocol developed by Phillips Semiconductors. Those having ordinary skill in the art will readily recognize that a variety of controllers, including both Smart Battery Specification compliant controllers and non-compliant controllers can be used for controller 140.

Current sense circuit 150 measures the current flow (either as a current measurement directly, or a voltage measurement across a sense resister 155 as shown) from the power sources, through their respective switches 110, 120, and 130, to the load. When current sense circuit 150 determines that the current flow is too high (e.g an over-current condition), it notifies latch 170. During normal operation where the current flow is within normal parameters (e.g an under-current condition), current sense resistor 155 adds little to the total impedance of the load, and current sense circuit 150 provides an under-current signal to latch 170. A variety of discrete or integrated components can be used to construct current sense circuit 150. An example of a precision high-side current sense amplifier typical of those used is available from Maxim Integrated Products, under the trade designation MAX472.

Latch 170 can be any of a variety of devices designed to hold a set output value. Thus, "latch" should be given its broadest meaning and not be read to include only those devices where the output follows the input when enabled (or activated) and hold the last value when disabled. In general, however, latch 170 operates in such a manner that its output signal is a switch deactivation signal when it receives an over-current signal from circuit 150, and that output signal is provided to controller 140 (as shown), or alternatively directly to switches 110, 120, and 130.

Since protection circuit 100 is used with three power sources, there are periods during the circuit's operation when power source selection controller 140 is switching between power sources. Thus, controller 140 preferably implements break-before-make timing to avoid current spikes when two power sources are simultaneously connected to the load. For example, if rechargeable battery A has a low charge, and the controller wishes to (or has been instructed to) switch the power source to rechargeable battery B, controller 140 sends the appropriate deactivating signal to switch 110, waits an appropriate amount of time (e.g., a calculated turn-off time or a predetermined turn-off time), an then sends the activating signal to switch 120.

However, as noted above, certain in-rush currents can still be generated during the switch from one power source to another. These in-rush currents are generally not harmful to the load, in part because of their short duration, but they can be high enough to cause current sense circuit 150 to activate the latch, which would, in turn, unnecessarily shut off switches 110, 120, and 130. Blanking logic 160 monitors the signals provided by controller 140 to the switches to determine whether a switching condition is occurring, that is, when all off the switches are off. Such logic can be accomplished using a variety of different logic gates, depending upon the nature of the signals to be analyzed. When blanking logic 160 senses that all of the switches are off its output causes the input to latch 170 to be an under-current signal. Thus, during a blanking-condition, the latch does not cause the switches to open. This is particularly important where the latch accomplishes its task by providing a signal to controller 140, which, in turn, notifies each of the switches. The time period during which blanking logic 160 prevents latch 170 from providing a switch deactivating signal can be predetermined (e.g., based on an RC circuit) or can depend on a variety of parameters. Additionally, the output of blanking logic 160 can be designed to provide a signal directly to the controller.

Bypass resistors 115, 125, and 135 are each coupled in parallel with switches 110, 120, and 130, respectively. Bypass resistors 115, 125, and 135 allow a small amount of current to flow from the power sources into the load even when the switches are off, so as to pre-charge the circuit. The pre-charging provides a variety of benefits. For example, comparator 180 can compare the pre-charge voltage of the load to determine if there is a soft short or absolute short condition, even before power is applied through one of the switches 110, 120, and 130. Thus, if comparator 180 determines that the pre-charge voltage is not at an appropriate level, it can provide a switch deactivation signal to controller 140 thereby alerting the controller to the problem and preventing the controller from powering into a soft short or absolute short. Additionally, precharging helps to decrease in-rush currents by lowering the voltage difference experienced by the load when switching from a low voltage power source (e.g a discharged battery) to a higher voltage power source (e.g. a fully charged battery).

Figure 2A:
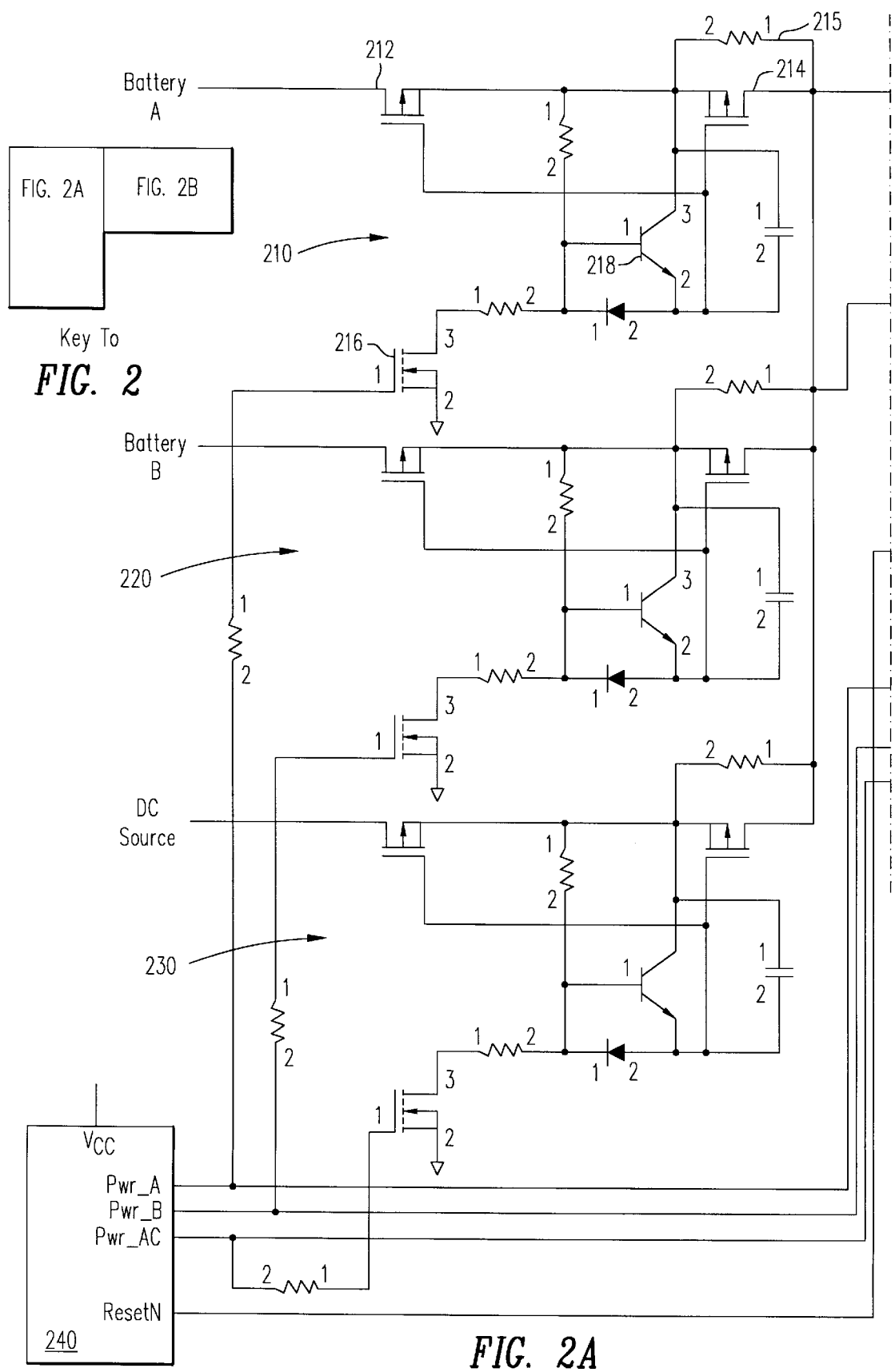
FIG. 2 is a schematic diagram of a protection circuit including a power source controller.
Figure 2B:
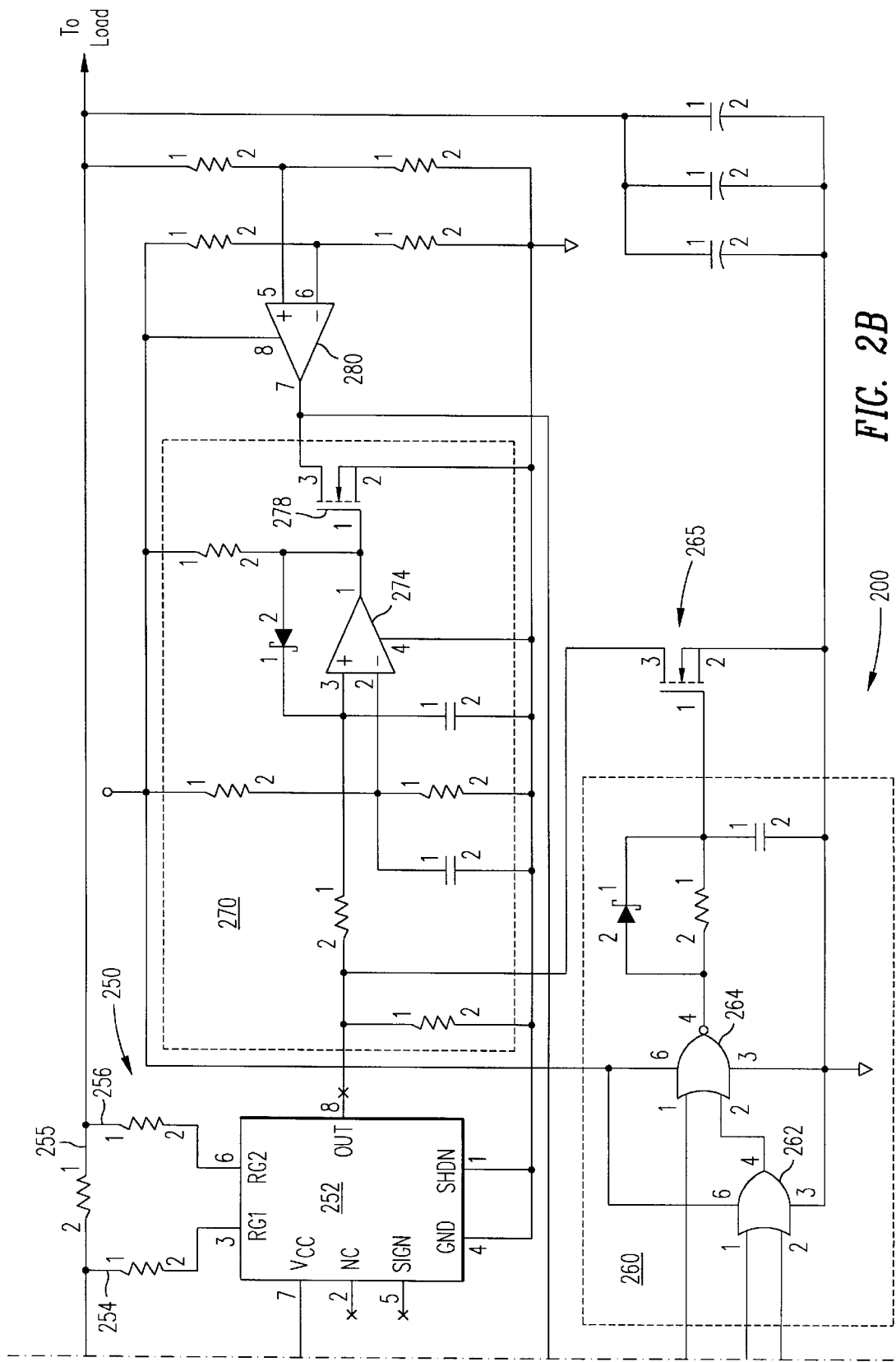

FIG. 2 is a schematic diagram of one specific implementation 200 of the protection circuit of FIG. 1. Switching circuits 210, 220, and 230 each allow one of three power sources (rechargeable battery A, rechargeable battery B, and a DC source) to electrically connect to the load, thereby supplying power to the load. Power selection controller 240 is coupled to each of the switching circuits, and can apply both activating and deactivating signals to each of the switching circuits. Switching circuits 210, 220, and 230 are generally constructed in a like manner, although there can be differences among them depending upon, for example, the type of power source they are intended to couple to the load.

The p-channel MOSFETs 212 and 214 of circuit 210 serve as the main switches between rechargeable battery A and the load. Bilateral MOSFETs are used because most power MOSFETs are manufactured with the body internally connected to the source. Because the body forms a diode with the channel, there is an effective diode (or body diode) from drain to source across each of the MOSFETs (not shown). The anode of the body diode in FET 212 is oriented toward the power source that switching circuit 210 controls, and so the diode can become forward biased and current conducting. However, the body diode in FET 214 is oriented in the opposite direction and will not be forward biased. Bypass resistor 215 is coupled in parallel across FET 214 to allow precharging as described above, and typically has a resistance on the order of a kilo-ohm. When controller 240 determines to, or is instructed to switch the load to rechargeable battery A, an active high signal is asserted on the controllers PWR_A pin. This causes FET 216 to be activated, which, in turn, pulls the base of transistor 218 toward ground, thereby activating bilateral MOSFETs 212 and 214. Switching circuits 220 and 230 operate in substantially the same manner.

Current sense circuit 250 includes current sense amplifier 252, such as the aforementioned MAX472, gain resistors 254 and 256, and sense resistor 255. The OUT pin of amplifier 252 provides an output signal that is proportional to the sensed current flow through sense resistor 255. The output signal is received by latch 270, and more particularly the non-inverting input of comparator 274. If the output voltage is greater than a predetermined value, the output from comparator 274 will open FET 278, thereby pulling the RESTN pin of controller 240 to ground, and causing the controller to reset, which, in turn, causes switching circuits 210, 220, and 230 to be deactivated.

Blanking logic 260 receives the switching circuit signals sent to switching circuits 210, 220, and 230, and uses these signals to determine if a blanking condition has occurred. Since a blanking condition occurs when all of the switches are deactivated (controller 240 asserts active low signals on all three pins PWR_A, PWR_B, and PWR_AC), OR gate 262 receives two logic 0 input signals, and produces a logic 0 output signal. NOR gate 264 receives one logic 0 signal from controller 240, and the output from gate 262, to produce a logic 1 output, causing FET 265 to pull the non-inverted input of comparator 274 to ground. Consequently, latch 270 is prevented from signaling controller 240 to deactivate the switching circuits under in-rush current conditions that might otherwise cause the latch to trigger. After a time period established by the RC circuit shown, the latch is allowed to function normally. Note that a variety of different logic designs could be used to achieve the same effect as blanking logic 260.

Comparator 280 monitors the pre-charge voltage developed by low current flow through bypass resistor 215, and similar bypass resistors in switching circuits 220, and 230. If the comparator determines that there is a short of some kind (e.g., the pre-charge voltage is not above a certain level), the comparator's output triggers switching circuit shutdown through the RESETN pin of controller 240.

The circuits of FIGS. 1 and 2 can be implemented as discrete components as shown, or they can be implemented as integrated circuits. Additionally, neither the controllers (140 and 240) nor the power switches need be included in the protection circuit itself. For example, the protection circuit can be integrated into a variety of circuits such as a battery selector circuit, a battery charger circuit, or a MOSFET gate drive device.

Regarding terminology used herein, it will be appreciated by one skilled in the art that any of several expressions may be equally well used when describing the operation of a circuit including the various signals and nodes within the circuit. Any kind of signal, whether a logic signal or a more general analog signal, takes the physical form of a voltage level (or for some circuit technologies, a current level) of a node within the circuit. It may be correct to think of signals being conveyed on wires or buses. For example, one might describe a particular circuit operation as "the output of circuit 10 drives the voltage of node 11 toward VDD, thus asserting the signal OUT conveyed on node 11." This is an accurate, albeit somewhat cumbersome expression. Consequently, it is well known in the art to equally describe such a circuit operation as "circuit 10 drives node 11 high," as well as "node 11 is brought high by circuit 10," "circuit 10 pulls the OUT signal high" and "circuit 10 drives OUT high." Such shorthand phrases for describing circuit operation are more efficient to communicate details of circuit operation, particularly because the schematic diagrams in the figures clearly associate various signal names with the corresponding circuit blocks and node names. Phrases such as "pull high," "drive high," and "charge" are generally synonymous unless otherwise distinguished, as are the phrases "pull low," "drive low," and "discharge." It is to be appreciated by those skilled in the art that each of these and other similar phrases may be interchangeably used to describe common circuit operation, and no subtle inferences should be read into varied usage within this description.

It should also be noted that insulated gate field effect transistors (IGFETs) are commonly referred to as MOSFET transistors (which literally is an acronym for "Metal-Oxide-Semiconductor Field Effect Transistor"), even though the gate material may be polysilicon or some material other than metal, and the dielectric may be oxynitride, nitride, or some material other than oxide. Use of such legacy terms as MOSFET should not necessarily be interpreted to literally specify a metal gate FET having an oxide dielectric.

While the invention has been described in light of the embodiments discussed above, one skilled in the art will recognize that certain substitutions may be easily made in the circuits without departing from the teachings of this disclosure. For example, many circuits using n-channel MOSFETs may be implemented using p-channel MOSFETs instead, as is well known in the art, provided the logic polarity and power supply potentials are reversed.

Figure 3:
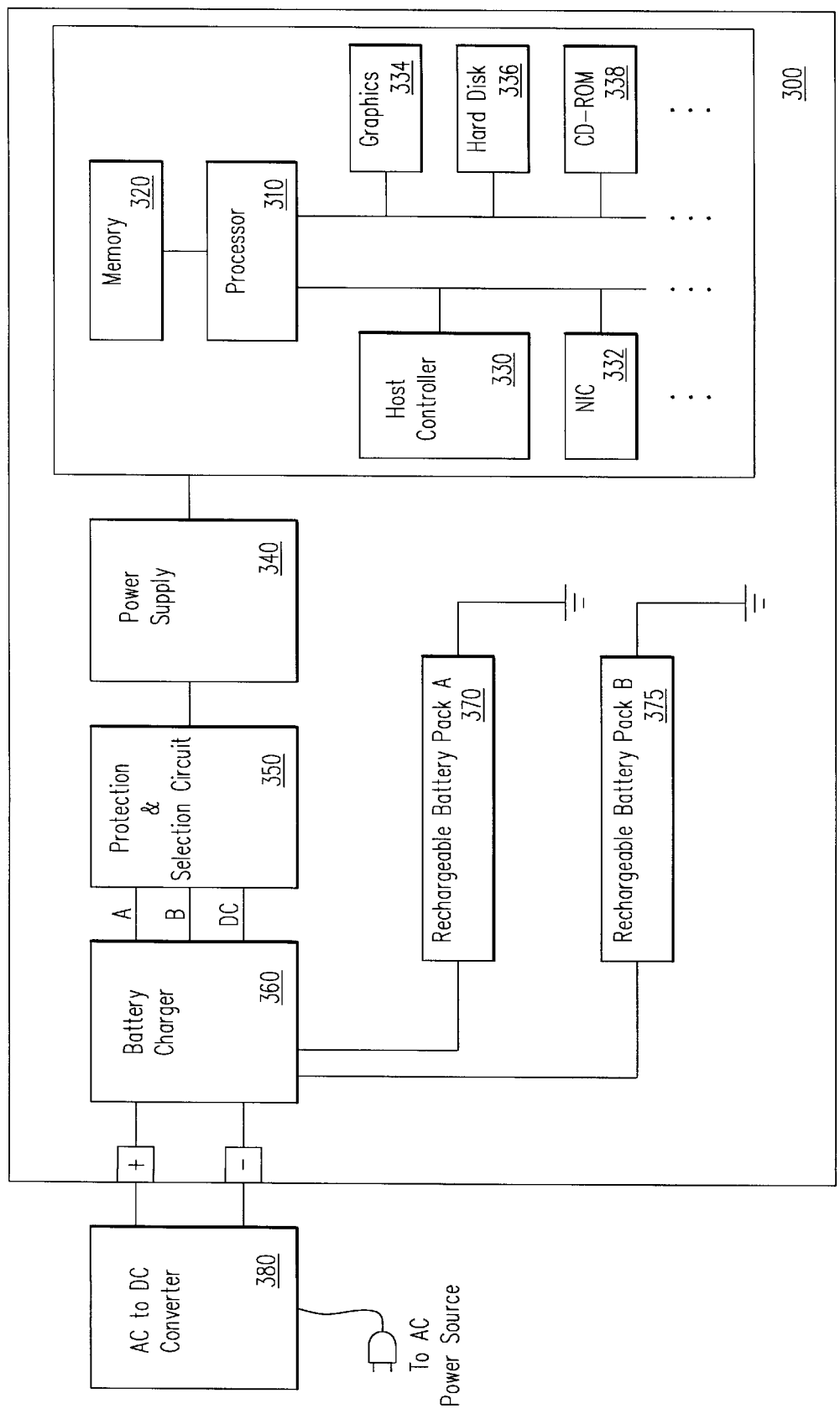
FIGS. 3 illustrates a computer system including a protection and power source selection circuit.

FIG. 3 illustrates a computer system 300 (e.g., a portable computer system) that includes a processor 310, a memory 320 coupled to the processor, and a variety of additional components coupled to the processor such as host controller 330 (e.g., an I/O controller available from Standard Microsystems Corporation under the trade designation FDC337N958FR), graphics adapter 334, network interface card (NIC) 332, hard disk drive 336, and CD-ROM drive 338. As demonstrated by the ellipses shown in the figure, the computer system can include a variety of other components (e.g., storage devices, communications devices, input devices and output devices) as is well known to those having ordinary skill in the art. These components receive power through power supply 340 (e.g., a DC to DC regulator), which in turn receives power from rechargeable battery pack A 370, rechargeable battery pack B 375, or a source external to computer system 300, such as AC to DC converter 380 which is coupled to an AC source. Protection and selection circuit 350 (such as the circuits of FIG. 1 and FIG. 2) controls which of the available power sources is connected to the supply power to the system.

Some or all of the rechargeable battery packs 370 and 375, battery charger 360, and protection and selection circuit 350 can be implemented as smart devices whereby they can exchange information among themselves or with other devices via a system management bus (not shown). Such information exchange enhances interoperability among devices. For example, rechargeable batter pack A 370 can provide computer system 300 (through host controller 330) and battery charger 360 with charging and present charge capacity information. In turn, computer system 300 can report to the user information including remaining battery capacity, remaining operating time, and availability of power for additional, specified loads. The system management bus also allows computer system 300 to monitor and provide optimal charging of rechargeable battery pack A 370. Additionally, the system management bus may be used to control the power consumption or operating state of various devices.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A protection circuit for an electronic device having a first and a second switch, each switch operable to electrically connect a first power source and a second power source, respectively, to a load, and each switch adapted to receive a first and a second signal, respectively, for selectively activating and deactivating the respective switch, the protection circuit comprising:
    a current-sense circuit coupled to the first and second switches, the current-sense circuit operable to measure a current supplied to the load through at least one of the first and the second switches, and operable to provide an over-current signal;
    a latch coupled to the current-sense circuit, the latch operable to receive the over-current signal from the current-sense circuit, and provide a switch deactivating signal as the first signal and the second signal to the first and second switch, respectively;
    a controller operable to provide at least one of an activating signal and a deactivating signal to each of the first switch and the second switch, the controller being coupled to the latch, the latch being operable to provide the switch deactivating signal to the controller, and the controller being operable to provide the switch deactivating signal as the first signal and the second signal to the first and second switch, respectively;
    a comparator having an non-inverted input, an inverted input, and an output; and
    an output switch coupled to the output of the comparator and operable to be activated and deactivated by a comparator output signal.

2. The protection circuit of claim 1 wherein the latch provides the deactivation signal through the output switch when the output switch is activated by the comparator.

3. The protection circuit of claim 1 wherein the controller is a smart battery selector circuit.

4. The protection circuit of claim 1 wherein the current-sense circuit includes a bi-directional high-side current-sense amplifier.

5. The protection circuit of claim 1 further comprising:
    a first resistor coupled in parallel with the first switch;
    a second resistor coupled in parallel with the second switch; and
    a comparator operable to compare a voltage across the load with a predetermined voltage.

6. The protection circuit of claim 5 wherein the comparator is operable to provide the switch deactivating signal as at least one of the first signal and the second signal to the first and second switch, respectively, when the voltage across the load is less than a predetermined voltage.

7. The protection circuit of claim 6 further comprising a controller coupled the comparator, wherein the comparator is operable to provide the switch deactivating signal to the controller, and the controller is operable to provide a deactivating signal to each of the first switch and the second switch in response to the switch deactivation signal.

8. The protection circuit of claim 1 wherein the first switch and the second switch are field effect transistors (FETs).

9. The protection circuit of claim 1 wherein the first power source is a rechargeable battery and the second power source is an alternating current (AC) to direct current (DC) converter.

10. A protection circuit for an electronic device having a first and a second switch, each switch operable to electrically connect a first power source and a second power source, respectively, to a load, and each switch adapted to receive a first and a second signal, respectively, for selectively activating and deactivating the respective switch, the protection circuit comprising:
    a current-sense circuit coupled to the first and second switches, the current-sense circuit operable to measure a current supplied to the load through at least one of the first and the second switches, and operable to provide an over-current signal;
    a latch coupled to the current-sense circuit, the latch operable to receive the over-current signal from the current-sense circuit, and provide a switch deactivating signal as the first signal and the second signal to the first and second switch, respectively;
    a controller operable to provide at least one of an activating signal and a deactivating signal to each of the first switch and the second switch; and
    blanking logic coupled to the controller and the latch, the blanking logic operable to receive the at least one of an activating signal and a deactivating signal provided to each of the first switch and the second switch, and to prevent the latch from providing the switch deactivating signal when both the first switch and the second switch receive a deactivating signal.

11. The protection circuit of claim 10 wherein the blanking logic further comprises a logic gate having an output terminal coupled to selectively activate a blanking switch, the blanking switch being coupled to an input of the latch.

12. The protection circuit of claim 11 wherein, the blanking switch couples the input of the latch to an under-current signal when the blanking switch is activated.

13. The protection circuit of claim 12 wherein the under-current signal is ground.

14. A computer system comprising:
    a processor;
    a memory coupled to the processor;

a first switch operable to electrically connect a first power source to the processor and memory, the first switch adapted to receive a first signal for selectively activating and deactivating the first switch;

a second switch operable to electrically connect a second power source to the processor and memory, the second switch adapted to receive a second signal for selectively activating and deactivating the second switch; and a protection circuit including:

a current-sense circuit coupled to the first and second switches, the current-sense circuit operable to measure a current supplied to the processor and memory through at least one of the first and the second switches, and operable to provide an over-current signal;

a latch coupled to the current-sense circuit, the latch operable to receive the over-current signal from the current-sense circuit, and provide a switch deactivating signal as at least one of the first signal and the second signal to the first and second switch, respectively;

a controller coupled to the first switch and the second switch, the controller operable to provide at least one of an activating signal and a deactivating signal to each of the first switch and the second switch; and blanking logic coupled to the controller and the latch, the blanking logic operable to receive the at least one of an activating signal and a deactivating signal provided to each of the first switch and the second switch, and to prevent the latch from providing the switch deactivating signal when both the first switch and the second switch receive a deactivating signal.

15. The computer system of claim 14 further comprising a rechargeable battery and an AC to DC converter, wherein the first power source is the rechargeable battery, and wherein the second power source is the AC to DC adapter.

16. The computer system of claim 14 wherein the controller is coupled to the latch, the latch being operable to provide the switch deactivating signal to the controller, and the controller being operable to provide the switch deactivating signal as the first signal and the second signal to the first and second switch, respectively.

17. The computer system of claim 14 wherein the controller is a smart battery selector circuit.

18. The computer system of claim 14 further comprising:

a first resistor coupled in parallel with the first switch;

a second resistor coupled in parallel with the second switch; and a comparator coupled to the first switch and the second switch, and operable to compare a voltage across at least the processor and the memory with a predetermined voltage.

19. The computer system of claim 18 wherein the comparator is operable to provide the switch deactivating signal as at least one of the first signal and the second signal to the first and second switch, respectively, when the voltage across at least the processor and the memory is less than a predetermined voltage.

20. The computer system of claim 19 further comprising a controller coupled to the first switch, the second switch and the comparator, wherein the comparator is operable to provide the switch deactivating signal to the controller, and the controller is operable to provide a deactivating signal to each of the first switch and the second switch in response to the switch deactivation signal.

* * * * *